United States Patent [19]

Aoyama

[11] 4,239,331
[45] Dec. 16, 1980

[54] MECHANICAL OPTICAL SWITCHING DEVICE

[75] Inventor: Tsutomu Aoyama, Tokyo, Japan

[73] Assignee: Nippon Electric Co., Ltd., Tokyo, Japan

[21] Appl. No.: 968,698

[22] Filed: Dec. 12, 1978

[30] Foreign Application Priority Data

Dec. 15, 1977 [JP] Japan ................. 52/151292

[51] Int. Cl.³ .................................................. G02B 5/14
[52] U.S. Cl. .................... 350/96.20; 350/96.15; 350/96.18
[58] Field of Search ............... 350/96.15, 96.20, 96.18

[56] References Cited

U.S. PATENT DOCUMENTS

| 3,519,116 | 7/1970 | Koehn ........................ 350/96.20 |
| 3,977,764 | 8/1976 | d'Auria ....................... 350/96.15 |

OTHER PUBLICATIONS

P. G. Hale and R. Kompfer, "Mechanical Optical-Fibre Switch" Elec. Letters, vol. 12, No. 15, 7-21,76, p. 388.

M. Papuchon, et al., "Electrically Switched Optical Directional Coupler: Cobra", App. Physics Letters, vol. 27, No. 5, 9/1/75, pp. 289-291.

*Primary Examiner*—Stewart J. Levy
*Attorney, Agent, or Firm*—Laff, Whitesel & Rockman

[57] ABSTRACT

An optical switching device for use with optical fibers. The fibers are positioned on input and output sides of the switch, with each fiber terminated by a lens for collimating incident light emitted from an input optical fiber. At least one transparent dielectric plate, with a uniform refractive index, is disposed between lenses associated with the input and output sides of the switch. The transparent plate changes the optical transmission path of the collimated light beam when present in a light transmission path. When the transparent dielectric plate is driven into the light transmission path, the optical axis is switched from one to a different output optical fiber.

4 Claims, 7 Drawing Figures

MECHANICAL OPTICAL SWITCHING DEVICE

This invention relates to a mechanical optical switching device for optical communication and, more particularly, a mechanical optical switching device for switching optical transmission paths.

In optical communication systems using an optical fiber as a transmission medium, which has been intensively developed while attracting a great public attention, optical switching devices are indispensable for mutual connection and disconnection of optical transmission paths are indispensable. Also, a semiconductor laser has been put into practical use as light source of a repeater in such optical communication systems, but no semiconductor lasers with a sufficient life expectancy have appeared yet. For this reason, to apply the semiconductor laser into the repeaters for submarine optical communication, in which maintenance work involves much difficulty, a plurality of the lasers are consequently used in such a way that, when one laser in use fades at the end of its life time, another laser is activiated and the remaining lasers are subsequently activated in this manner. Also in this case, the optical switching device is employed to turn from one to another laser.

For a conventional optical switching device, an electrically-switched optical directional coupler based on the optical integration technique is proposed in "APPLIED PHYSICS LETTERS", Vol. 27, No. 5 Sept. 1, 1975. This switching device can be operated at a high switching speed, whereas it has a disadvantage in that the insertion loss tends to take a large value and to be greatly affected by a change in temperature. As one approach to the solution of this problem, there is a trend to employ a mechanical optical switching device with a low insertion loss but with a relatively low switching speed. For details of this switching device, reference is made to "ELECTRONICS LETTERS", Vol. 12, No. 15, in particular FIG. 1 on page 388, July 22, 1972. The mechanical optical switching device described in this paper has a construction such that one input-side fiber and a couple of output-side fibers are provided in a squarecross section glass tube to enable the input-side fiber to be coupled with one output-side fiber and then to be switched to another output-side fiber in response to the switching operation. However, when the switched input-side fiber is restored, it frequently fails to return to its correct original position. In other words, the switching device lacks the switching reproducibility which greatly influences the insertion loss. Further, the tube is not made small enough to move the input-side fiber within the tube without deforming or bending it. This imposes a restriction upon the miniaturization of the optical switching device per se.

An object of the invention is therefore to provide a mechanical optical switching device free from the above-mentioned disadvantages.

The present switching device comprises an optical fiber provided on an input-side. A first lens means is provided for collimating an incident light beam emitted from the input optical fiber. At least one transparent dielectric plate, with a uniform refractive index, is disposed at a position succeeding the first lens means to change the optical transmission path of the collimated light beam. A plurality of second lens means are provided for focusing the light beam after it has passed through the first lens means. A plurality of optical fibers are provided on the output-side for receiving a light beam after it has passed through the second lens means. The dielectric plate is driven onto the optical axis of the input-side fiber and removed therefrom.

Now the invention will be described in greater detail in conjunction with the accompanying drawings, in which.

Figure 1:
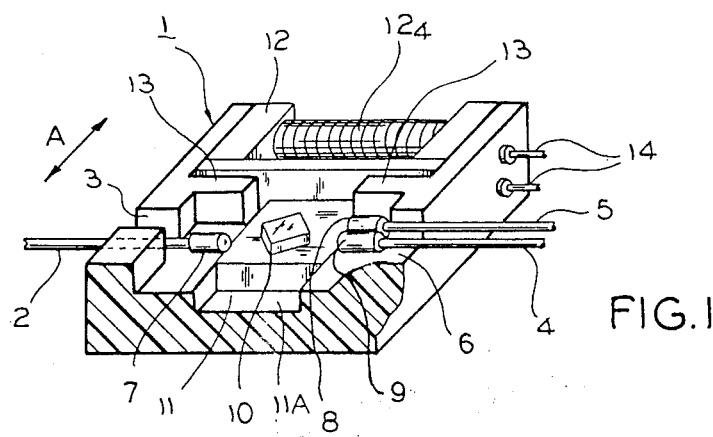
FIG. 1 shows a perspective view, partially broken, of a first embodiment.

In FIG. 1, an optical fiber 2 is provided on the input-side (referred to as "input fiber" hereunder) to provide a transmission path of a light beam. Fiber 2 is fixed onto a U-shaped notch 3 by a binding agent which is formed on the fringe of one side of a case 1 made of nonmagnetic material such as stainless material or synthetic resin. Two optical fibers 4 and 5 are provided on the output-side (referred to as "output fiber" hereunder) to receive the light beam emitted from the input fiber 2 and to permit the received light beam to pass therethrough. Fibers 4 and 5 are similarly fixed by the binding agent onto another U-shaped notch 6 formed on the fringe of the opposite side of the case 1.

An input rod (cylindrical) lens 7, for collimating the light beam emitted from the input fiber 2, is provided on the base of the case 1 so as to optically couple with the input optical fiber 2. Also, two output rod lenses 8 and 9, for focusing the light beam passed through the input lens 7, are mounted on the base of the case 1 so as to optically couple with the output fibers 4 and 5, respectively. A movable plate 11 is placed in a groove 11A formed between the input lens 7 and the output lenses 8 and 9. The movable plate 11 is slidable along the groove 11A in directions indicated by a double-ended arrow A, under control of a driving means such as an electromagnet 12 which is disposed at the rear part of the case 1 shown in the drawing. A dielectric plate 10, which is mounted on the movable plate 11, moves with the movable plate 11 to change the optical transmission path between the input lens 7 and the output lenses 8 and 9 depending on the switching operation. The dielectric plate 10 is made of glass with a uniform refractive index and with light-transmission surfaces parallel with each other. Stoppers 13 extend inwardly from both sides of the case 1 to restrict the movement of the plate 11 to the directions indicated by the arrow A so that the optical switching operation may be correctly achieved. The electromagnet 12 is energized by electric power which is externally supplied through terminals 14.

Figure 2:
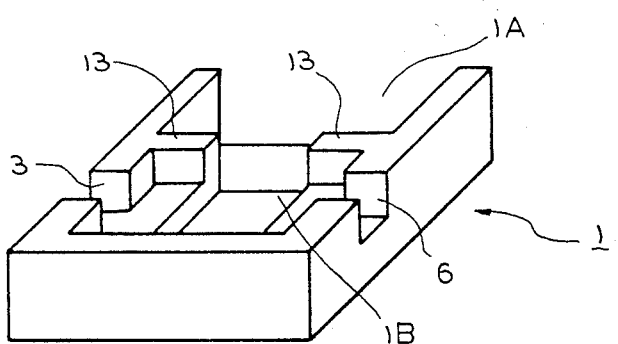
FIG. 2 shows a perspective view of a case used in the first embodiment.

In FIG. 2, the case 1 has a section 1A for accommodating the electromagnet 12 therein and a section 1B for accommodating lenses 7 to 9. Section 1B is shallower in the bottom than the section 1A.

Figure 3:
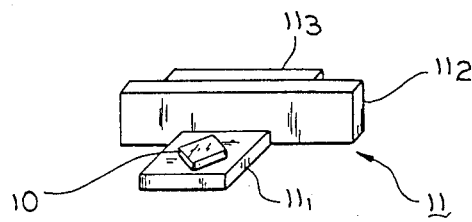
FIGS. 3 and 4 show details of parts of the embodiment.

FIG. 3 shows the movable plate 11, is comprised of a member $11_1$ for carrying the dielectric plate 10 thereon, a rear member $11_2$ fastened to the end face of the member $11_1$ and an iron member $11_3$ attached to the rear member $11_2$ and directly attracted by the electromagnet 12. The members $11_1$ and $11_2$ are made of corrosion resistive material such as stainless material.

Figure 4:
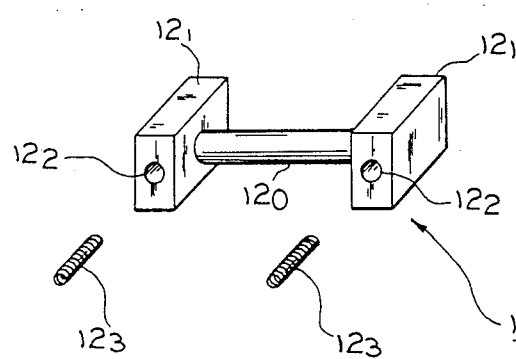

The electromagnet 12 is composed of a core $12_0$ (FIG. 4) having at both of its ends rectangular parallelepiped collars $12_1$ each having a hole $12_2$. A coil $12_4$ (FIG. 1) is wound around the core $12_0$. Springs $12_3$ are inserted into the holes $12_2$ to press the movable plate 11 against the stoppers 13 when the electromagnet 12 is not energized.

Figure 5:
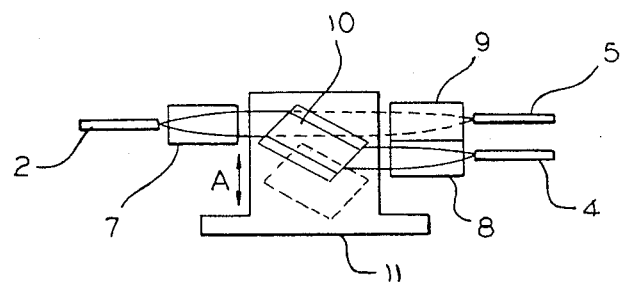
FIG. 5 is a schematic diagram for explaining the operation of the present invention.

The operation of the first embodiment will be described with reference to FIG. 5. Assume now that the electromagnet 12 is energized. Under this condition, the movable plate 11 is magnetically attracted and the dielectric plate 10 does not lie on the optical axis of the input fiber 2. In this case, the incident light beam emitted from the input optical fiber 2 is collimated by the lens 7 and then is focused by the lens 8 to travel into and through the optical fiber 4.

When the elecromagnet 12 is deenergized, the dielectric plate 10 lies on the optical axis of the fiber 2. Accordingly, the optical transmission path of the collimated light beam emitted from the input lens 7 is changed to travel into the lens 9. As a result, the light beam through the lens 9 is focused and launched into the optical fiber 5. In this manner, the light beam emerging from the fiber 2 is made incident onto the fiber 4 or 5 by placing the dielectric plate 10 on the optical axis of the fiber 2 or by removing it therefrom. In this case, the shift distance S of the optical transmission path is given by the formula $$S = \frac{t \cdot \sin(\theta - \phi)}{\cos \phi}, \phi \sin^{-1}\left(\frac{\sin \theta}{n}\right)$$

where t and n denote the thickness and the refractive index of the dielectric plate 10 and $\theta$ is the incident angle of the light beam with respect to the dielectric plate 10.

As described above, the present invention can achieve a mechanical optical switching device, with the excellent switching reproducibility, in a considerably small size.

A mechanical optical switching device designed on the basis of the structure of FIG. 1 brought about the following results. The above-mentioned insertion loss, the change of the insertion loss within the temperature range from five to forty-five degrees centigrade and the switching reproducibility were 0.8 dB (decibel), 0.2 dB, 0.02 dB, respectively. The components used and the physical dimensions thereof were as follows: Each of the grade-index rod lens 7-9 was 4.5 mm (millimeters) in length and 1.8 mm in diameter. The spacing between the lenses 7 and 8 or 9 is 20 mm; incident angle $\theta$ is 60 degrees; each of the fibers 2, 4 and 5 has a core diameter of 60 microns. Fibers of the graded-index type with N.A. (numerical aperture)=0.21 are used. The shift distance S of the optical transmission path is 1.8 mm. A light emitting diode with wave length of 0.85 micron is used as a light source to feed the incident light beam into the fiber 2; and the diameter W of the light beam collimated by the lens is 0.62 mm.

Figure 6:
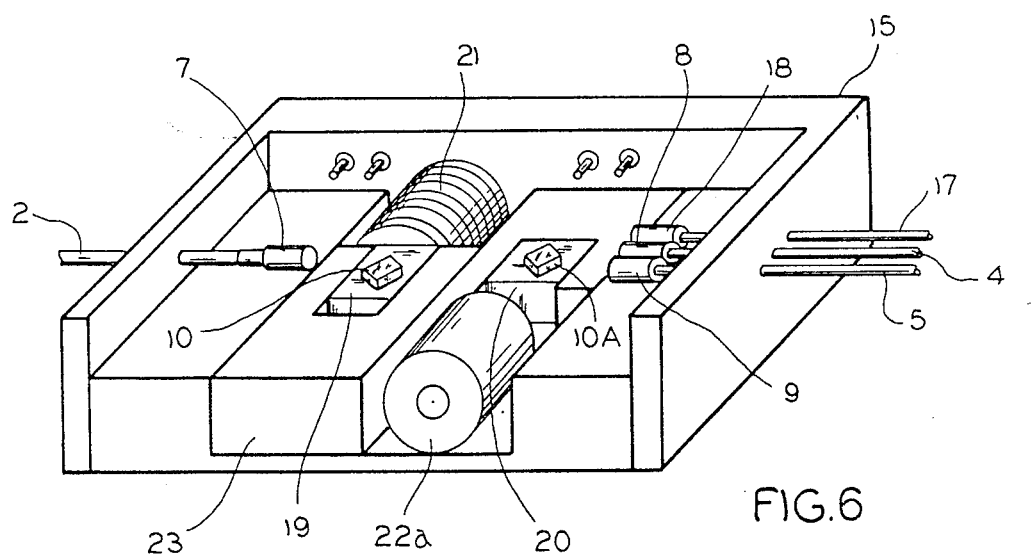
FIG. 6 shows a perspective view of a second embodiment.

FIG. 6 illustrates another embodiment which permits a light beam from the input fiber 2 to selectively couple with any one of three output fibers. In the figure, like reference numerals represent like structural elements in the drawing of FIG. 1.

This embodiment is comprised of input fiber 2 and lens 7, output fibers 4, 5, 17 and lenses 8, 9 and 18, dielectric plates 10 and 10A disposed between the lens 7 and the lenses 8, 9 and 18 for changing the optical transmission path of the light beam given from the lens 7, holders 19 and 20 for holding these dielectric plates 10 and 10A, electromagnets 21 and 22 for driving said holders 18 and 20, and a case 15 for housing and accommodating these components.

Figure 7:
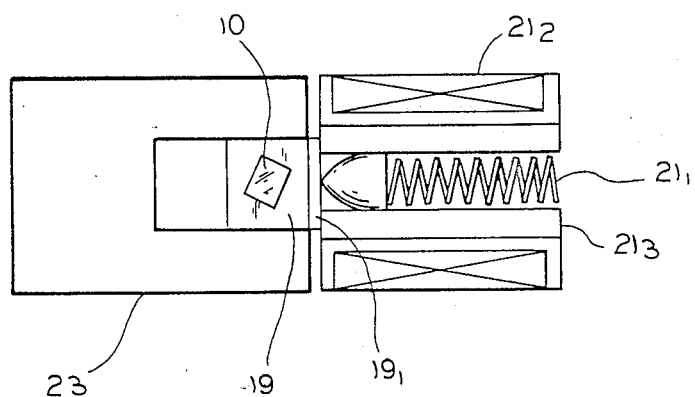
FIG. 7 shows a plan view of parts of the second embodiment.

In FIG. 7, a guide 23 in the case 15 has a concave potion or a groove through which the holder 19 reciprocately is moved responsive to the attraction of the electromagnet 21 and a spring $21_1$ which is built to the electromagnet 21. Reference numerals $21_2$ and $21_3$ identify a coil and a core, respectively, and numeral $19_1$, a soft iron plate.

In the switching operation, when the dielectric plate 10 lies on the optical axis of the fiber 2 (FIG. 6), the coupling is made between the fibers 2 and 5. On the other hand, when the dielectric plate 20 is positioned on the optical axis of the fiber 2, the coupling is set up between the fibers 2 and 17. Additionally, if none of the dielectric plates 10 and 10A is on the optical axis of the fiber 2, the coupling is made between the fibers 2 and 4.

What is claimed is:

1. A mechanical optical switching device comprising: an optical fiber means on the input side of said switching device; first lens means for collimating an incident light beam emitted from said input-side optical fiber and into said switching device; at least one transparent dielectric plate means with a uniform refractive index disposed at a position which receives said light collimated by said first lens means, said transparent dielectric plate means changing the optical transmission path of said light beam after it has passed through said first lens means; a plurality of second lens means positioned to selectively receive light from said plate means, said second lens means focusing the light beam passed through said first lens means; a plurality of optical fiber means on the output-side of said switching device for receiving said light beam emerging through said second lens means; and means for driving said dielectric plate to selectively switch the optical axis of said input-side fiber.

2. The device of claim 1 wherein said driving means comprises at least one electromagnet means for laterally moving said transparent plate between two switching positions.

3. The device of claim 2 and a block of material having a plurality of cavities therein, a pair of cavities being disposed on the input and output sides of said block to respectively receive said input side and output side optical fibers and support said first and second lens means.

4. The device of claim 3 wherein said block further contains a guideway groove positioned between said pair of cavities to guide and direct the lateral movement of said transparent plate.

* * * * *